United States Patent [19]

Laughner et al.

[11] Patent Number: 5,714,537
[45] Date of Patent: Feb. 3, 1998

[54] FILLED CARBONATE POLYMER BLEND COMPOSITIONS

[75] Inventors: Michael K. Laughner, Lake Jackson, Tex.; Robert C. Miller, Midland, Mich.

[73] Assignee: The Dow Chemical Company, Midland, Mich.

[21] Appl. No.: 627,841

[22] Filed: Apr. 3, 1996

Related U.S. Application Data

[63] Continuation of Ser. No. 294,164, Aug. 22, 1994, abandoned.

[51] Int. Cl.$^6$ .................................. C08J 3/00; C08K 3/34; C08L 51/00; C08L 69/00
[52] U.S. Cl. .................. 524/445; 264/148; 524/443; 524/449; 524/451; 524/502; 524/537; 524/492; 524/493
[58] Field of Search .................... 264/148; 524/443, 524/445, 449, 451, 502, 537, 492, 493

[56] References Cited

U.S. PATENT DOCUMENTS

| | | | |
|---|---|---|---|
| 3,424,703 | 1/1969 | Jones et al. ............................ | 260/18 |
| 3,852,394 | 12/1974 | Kubota et al. . | |
| 4,028,433 | 6/1977 | Prinz et al. . | |
| 4,098,734 | 7/1978 | Lee ...................................... | 260/17 |
| 4,148,842 | 4/1979 | Yu et al. . | |
| 4,393,161 | 7/1983 | Van Abeelen et al. . | |
| 4,466,912 | 8/1984 | Phillips et al. . | |
| 4,487,881 | 12/1984 | Rawlings et al. . | |
| 4,544,706 | 10/1985 | Finch et al. . | |
| 4,636,553 | 1/1987 | Katto et al. . | |
| 4,665,122 | 5/1987 | Robeson et al. . | |
| 4,749,745 | 6/1988 | Biglione et al. . | |
| 4,855,357 | 8/1989 | Whalen et al. . | |
| 4,929,673 | 5/1990 | Laughner et al. . | |
| 5,079,316 | 1/1992 | Sun et al. . | |
| 5,087,663 | 2/1992 | Laughner . | |
| 5,091,461 | 2/1992 | Skochdopole ...................... | 524/493 |
| 5,162,419 | 11/1992 | Pottier-Metz et al. . | |
| 5,189,091 | 2/1993 | Laughner ............................ | 524/537 |
| 5,276,256 | 1/1994 | Niessner et al. ................... | 524/537 |

FOREIGN PATENT DOCUMENTS

| | | |
|---|---|---|
| 0 135 904 | 3/1985 | European Pat. Off. . |
| 0 452 788 | 10/1991 | European Pat. Off. . |
| 52-063954A | 5/1977 | Japan . |
| 62-138550 | 6/1987 | Japan . |
| 63-215760A | 9/1988 | Japan . |
| 2-086650A | 3/1990 | Japan . |
| 3-021664A | 1/1991 | Japan . |
| 5-170992A | 7/1993 | Japan . |

OTHER PUBLICATIONS

Hayashi Kasei Brochure, Technical Information, Micron White® #5000A #5000S Micel Tone®.
Derwent 80–04425C/03 (1984).
Derwent 86–004376/01 (1986).
Derwent 86–016510/03 (1986).

*Primary Examiner*—Patrick Niland

[57] ABSTRACT

Blends of (a) a carbonate polymer component and (b) a monovinylidene aromatic copolymer component not containing a grafted rubber polymer component and (c) an inorganic filler component are prepared having improved combinations of processability, resistance to linear thermal expansion and low temperature toughness. Specifically shaped, small particle size fillers (c) are preferably employed which provide the resistance to linear thermal expansion and maintain the impact resistance of the filled blend.

20 Claims, No Drawings

FILLED CARBONATE POLYMER BLEND COMPOSITIONS

CROSS-REFERENCE TO RELATED APPLICATIONS

This is a continuation of application Ser. No. 08/294,164, filed Aug. 22, 1994 now abandoned.

The present invention relates to filled polymer blend compositions comprising a carbonate polymer, a monovinylidene aromatic copolymer and an inorganic filler. It has unexpectedly been found that these blends are surprisingly easy to process and possess an unexpectedly improved combination of modulus (stiffness) and linear thermal expansion resistance while maintaining a good, cost effective balance in other categories of physical properties including weatherability, surface aesthetics, heat resistance and toughness. These compositions are particularly useful in the preparation of molded objects, particularly large parts prepared by injection molding techniques and requiring good combinations of these types of properties. Such properties are particularly desired for the production of injection molded automobile mirror housings, cowl vent grills and instrument panels or instrument housings such as for power tools or telephones.

The utilization of carbonate polymer blends in some applications has typically been accompanied by some undesired effects due to the fact that these polymers have a relatively high coefficient of linear thermal expansion (CLTE). The CLTE value reflects the tendency of a material to undergo dimensional changes due to thermal fluctuations, especially when in the form of larger molded or extruded articles. For example, if an instrument panel of an automobile expands or contracts excessively in extremely hot or cold conditions it might result in buckling or misfit in the assembled finished product, squeaking and/or stress fracturing at the point of fastening. Otherwise, there must be sufficient compensation in the product construction or fastening device for the expansion and contraction of the part.

In applications such as interior automotive parts, it is also desirable to provide low temperature impact resistance. While it is possible to provide improved heat resistance, modulus and coefficients of linear thermal expansion in carbonate polymer blends by the incorporation of increased amount of fillers, toughness, particularly low temperature dart impact resistance, is often reduced to unacceptable levels by fibrous fillers. Currently, glass-filled copolymers of styrene and maleic anhydride (SMA) are one of the materials most often used for injection molding high modulus automobile instrument panels. These materials are sufficiently stiff and heat resistant to perform in this function but typically are brittle and have breakage problems during installation and/or transportation and have an unacceptable surface for non-covered applications. Moreover, fibrous reinforcing additives such as glass fiber are anisotropic in nature and very efficient in lowering the CLTE in the flow direction but not in the cross flow direction. These additives are also known to cause excessive wear in processing and molding equipment.

In the past, various techniques have been employed in attempting to prepare or modify filled carbonate polymer blends to reduce or eliminate these limitations and make these polymers suitable for a wider range of applications. In EP 135,904 it is shown that specified blends of poly (ethylene terephthalate), carbonate polymer and grafted rubber impact modifiers have good combinations of impact strength and resistance to warpage when containing talc filler. U.S. Pat. No. 4,098,734 discloses blends comprising a matrix interpolymer, a grafted rubber copolymer, a polymer other than the two foregoing polymers having a solubility parameter in the range of 8.5 to 13 and an inorganic filler. U.S. Pat. No. 4,763,133 discloses, as a layer in multilayer laminate antenna structure, blends of certain thermoplastic resins with inorganic fillers, including glass fiber, talc or clay. The filler is added to lower the coefficient of linear thermal expansion while raising the flexural modulus. Carbonate polymer is listed among the numerous thermoplastic resins alleged to be suitable for use in this layer of the laminate.

U.S. Pat. No. 3,424,703 discloses that from 0.025 to 0.5 weight percent silica or talc fillers with a particle size up to 10 micrometers can be incorporated into aromatic polycarbonates to provide thin, relatively haze-free films with a low coefficient of linear thermal expansion.

In JP 52-63,954 (1977) there are disclosed blends composed of 20 to 45 weight percent of an ABS resin, 45 to 20 weight percent of a polycarbonate resin and from 5 to 30 weight percent talc. In JP 138,550 (1987) polybutylene terephthalate is added to polycarbonate/inorganic filler (e.g., talc) blends to attempt to improve toughness. In U.S. Pat. No. 5,091,461, it is shown that specified talc fillers, having the proper small size and plate shape provide specific blends of carbonate and rubber modified vinyl aromatic polymers with good combinations of CLTE, toughness and resistance to heat distortion.

While the use of rubber impact modifiers in these types of carbonate/monovinylidene aromatic copolymer blends is known and helps improve or maintain the toughness, it is known that product cost, heat resistance, modulus, weatherability and processability, can be adversely affected. On the other hand, as noted in JP 51-70,992 (1976), it has also been found that carbonate/monovinylidene aromatic copolymer blends that do not contain a rubber component are very difficult to process into standard pellets and shaped or extruded articles due to the tendency of these polymer to exhibit die swell upon their extrusion from the die orifice.

In view of the continuing need for improved combinations of properties in engineering thermoplastics, it would be desirable if there were provided a filled polymeric blend with improved combinations of cost, processability, surface aesthetics and physical properties including CLTE, modulus, impact resistance (especially at low temperatures), weatherability and resistance to heat distortion.

According to the present invention there is now provided such filled polymer blend compositions comprising (a) a carbonate polymer component; (b) a monovinylidene aromatic copolymer not containing a grafted rubber polymer component; (c) an inorganic filler which has a number average particle size less than or equal to about 10 micrometers (μm) and an average diameter to thickness ratio (D/T) of from about 4 to about 30; the carbonate polymer component optionally comprising (a)(1) a rubber polymer impact modifier component. Preferably, the filled polymeric blend compositions according to claim 1 comprise (a) carbonate polymer in an amount of from about 50 to about 95 percent by weight based on weight of components (a) and (b); (b) monovinylidene aromatic copolymer in an amount of from about 5 to about 50 percent by weight based on weight of components (a) and (b); and (c) inorganic filler in an amount of from about 1 to about 17 percent by weight based on weight of components (a), (b) and (c).

One embodiment of the present invention is a filled polymer blend composition comprising (a) a carbonate polymer component containing a rubber polymer component; (b) a monovinylidene aromatic copolymer not containing a grafted rubber polymer component and (c) an inorganic filler. Another embodiment of the present invention is a filled polymer blend composition comprising (a) a carbonate polymer component; (b) a monovinylidene aromatic copolymer; (c) an inorganic filler and no grafted rubber polymer component. In a specific preferred embodiment, the inorganic filler is selected from the group consisting of talc, clay and mixtures thereof.

It has been observed that inorganic fillers, particularly talc- and clay-type fillers, preferentially locate in the monovinylidene aromatic copolymer phase of polycarbonate/monovinylidene aromatic copolymer blends and proper selection of the the monovinylidene aromatic copolymer can be used to provide optimized blend properties. A key aspect in the preparation of the improved blends according to the present invention is the use of a relatively high molecular weight monovinylidene aromatic copolymer that does not contain a rubber component, preferably a copolymer with an ethylenically unsaturated nitrile monomer, to produce an excellent combination of properties in carbonate polymer blends containing an inorganic filler.

It has also been found that comonomer content in the monovinylidene aromatic copolymer can be adjusted to further optimize the balance of physical properties. The monovinylidene aromatic copolymer content in the blend can also be adjusted in connection with the inorganic filler content to provide desired balances in the physical properties such as heat resistance, CLTE and resistance to die swell. Surprisingly it has been found that toughness and impact resistance can be maintained in blends according to the present invention, without relying on a rubber-containing impact modifier component. Such blends are therefore particularly valuable since impact modifiers tend to increase product cost and can result in poor modulus, CLTE, heat resistance and weatherability.

In a further embodiment the present invention is also an improved process for reducing the die swell in processes for preparing extruded articles or pellets from carbonate polymer/monovinylidene aromatic copolymer blends comprising the step of extruding a polymer blend composition as described herein to form an article or a strand which is cut into pellets.

In general, monovinylidene aromatic copolymers are well known and commercially available. As is known, such copolymers comprise polymerized therein one or more monovinylidene aromatic monomer and one or more copolymerizable ethylenically unsaturated comonomers, the relative amounts of each being determined by desired polymer properties and cost. In particular, styrene is the most frequent monovinylidene aromatic monomer employed commercially and is a preferred monovinylidene aromatic monomer. Other commercially available monovinylidene aromatic monomers include lower alkyl-substituted (from 1 to 4 carbon atoms) and halogen-substituted styrenes, where the substitution can be on the vinylidene moiety (e.g., alpha methyl styrene) or on the aromatic ring such as one or more of the vinyl toluenes or t-butyl styrene, and/or ring halogenated styrenes.

The monovinylidene aromatic copolymer molecular weight was found to play a key role in achieving improved physical properties such as dart impact resistance, tensile strength and elongation. The monovinylidene aromatic copolymers suitably employed according to the present invention are preferrably relatively high molecular weight monovinylidene aromatic copolymers. As used herein with regard to the monovinylidene aromatic copolymers, the term "molecular weight" of the copolymer refers to the weight average molecular weight (Mw) as measured by gel permeation chromatography using a polystyrene standard. In order to provide adequate levels of toughness and impact resistance, the copolymers suitable for use in the blends according to this invention should have molecular weights of at least about 140,000, preferably at least about 145,000, and most preferably at least about 150,000. In order to obtain the desired levels of melt flow or processability, the copolymers suitable for use in the blends according to this invention should have molecular weights less than or equal to about 250,000, preferably less than or equal to about 230,000, most preferably less than or equal to about 200,000. Techniques to prepare higher molecular weight copolymers of this type are generally known in the art.

As mentioned above, the monovinylidene aromatic copolymers will also contain one or more copolymerizable ethylenically unsaturated monomers (i.e., comonomers), preferably a polar comonomer, which comonomers include the ethylenically unsaturated nitrile monomers (such as acrylonitrile, methacrylonitrile and/or fumaronitrile); maleic acid derivatives such as maleic anhydride; alkyl (meth) acrylates such as methylmethacrylate; N-substituted maleimides such as N-phenylmaleimide; or other polymerizable comonomers. Acrylonitrile (AN), methyl methacrylate (MMA) and maleic anhydride (MA) are the comonomers used in most of the commercial monovinylidene aromatic copolymers. The ethylenically unsaturated nitrile monomers and the alkyl (meth)acrylates are particularly preferred comonomers.

The experiments generally show that as the percent comonomer is increased, the tensile strength, dart impact resistance, flexural modulus, and notch sensitivity increase while gloss and, unexpectedly, CLTE are somewhat reduced.

In order to provide adequate levels of impact resistance, CLTE and modulus, the monovinylidene aromatic copolymers suitable for use in the blends according to this invention should contain the selected comonomer(s) in amounts of at least about 10 weight percent based on total weight comonomer(s) and monovinylidene aromatic monomer(s), preferably at least about 15 weight percent, more preferably at least about 18 weight percent, more preferably at least about 20 weight percent and most preferably at least about 23 weight percent. As discussed in more detail below, it can be particularly important to employ at least about 23 weight percent comonomer in the monovinylidene aromatic copolymer where it is intended to incorporate certain optional rubber components in the carbonate polymer component.

In order to obtain desirable modulus, CLTE, impact strength and melt viscosity levels, the copolymers suitable for use in the blends according to this invention should contain the selected comonomer(s) in amounts of less than or equal to about 40 weight percent based on total weight comonomer(S) and monovinylidene aromatic monomer(s), preferably less than or equal to about 37 weight percent, more preferably less than or equal to about 35 weight percent, and most preferably less than or equal to about 33 weight percent. The balance of such monovinylidene aromatic copolymers would obviously be the selected monovinylidene aromatic monomer(s). Highly preferred copolymers contain from about 65 to about 85 percent styrene monomer and 15 to 35 percent ethylenically unsaturated nitrile monomer.

In general, the monovinylidene aromatic copolymer is employed in amounts to improve the processability of the blend composition and maintain the desired physical properties. The monovinylidene aromatic copolymer is typically incorporated into the blend of the present invention in amounts of at least about 5 weight percent, preferably at least about 7 weight percent, more preferably at least about 10 weight percent and most preferably at least about 15 weight percent, said weight percentage being based on weight of carbonate polymer and monovinylidene aromatic copolymer components.

In order to generally maintain the resin blend physical properties the monovinylidene aromatic copolymer is typically incorporated into the blend of the present invention in amounts up to and including about 45 weight percent, preferably about 40 weight percent, more preferably about 30 weight percent and most preferably about 25 weight percent based on total weight of the carbonate polymer, monovinylidene aromatic copolymer and, if used, rubber components.

With regard to the upper limits for the monovinylidene aromatic copolymer content, it has been found that the compositions according to the invention begin to lose some of the optimized property combinations as the monovinylidene aromatic copolymer content is increased to the point where its phase volume is sufficiently large that it starts to become co-continuous with the carbonate polymer phase. As known to those skilled in this area, as the phase volume of a dispersed monovinylidene aromatic copolymer component in a polycarbonate blend increases, there is a transition from dispersed particles or domains of the minor component through a co-continuous morphology where no single phase is dominant. At this point, it has been found that several of the desired properties of the polycarbonate blend, such as heat resistance and impact resistance, begin to diminish unacceptably.

It has subsequently been found that in the case of the carbonate polymer/monovinylidene aromatic copolymer blends according to the present invention, where the inorganic filler locates preferentially in the monovinylidene aromatic copolymer, such as with talc- and clay-type fillers, this correspondingly increases the monovinylidene aromatic copolymer volume. The contents of these two components, therefore, need to be balanced appropriately. In this regard, in the preferred embodiments of the present invention, it has been found that the total volume of the two components should not exceed about 45 weight percent for optimized property combinations in the blends, and preferably is less than about 40 weight percent, more preferably less than about 38 weight percent and most preferably less than about 33 weight percent.

As mentioned above, the compositions according to the invention do not contain a grafted rubber component in the monovinylidene aromatic polymer phase, and in one embodiment, preferably contain no grafted rubber component at all, in order to obtain improved combinations of desired properties. If desired to further improve the notch sensitivity and/or low temperature impact resistance, it is possible to use an ungrafted rubber polymer impact modifier or a grafted rubber polymer impact modifier component selected such that it will locate in the carbonate polymer component. Preferably any rubber polymer impact modifier will locate in the carbonate polymer component, most preferably only in the carbonate polymer component. If a rubber polymer impact modifier component is employed, it is preferably one or more of the various known types of rubber materials.

In general, such rubber materials have elastic properties and have glass transition temperatures (Tg's) less than 0° C., generally less than −10° C., preferably less than −20° C. and more preferably less than −30° C. Suitable rubbers include the well known homopolymers and copolymers of conjugated dienes, particularly butadiene; as well as other rubbery polymers such as olefin polymers, particularly copolymers of ethylene, propylene and optionally a nonconjugated diene; or acrylate rubbers, particularly homopolymers and copolymers of alkyl acrylates having from 4 to 6 carbons in the alkyl group. In addition, mixtures of the foregoing rubbery polymers may be employed if desired. Preferred rubbers are homopolymers of butadiene and copolymers thereof with up to about 30 percent by weight styrene. Such copolymers may be random or block copolymers and in addition may be hydrogenated to remove residual unsaturation. Also preferred are rubbery polymers prepared from mono-olefins with optional nonconjugated diene monomers due to their resistance to weathering as compared to conjugated diene rubbers.

Where incorporated, the rubbers are preferably grafted with an amount of a graft polymer or selected based on their composition such that they will be located in the carbonate polymer phase. As taught in U.S. Pat. No. 5,087,663, the selection of comonomer type and amount for the monovinylidene aromatic copolymer and grafted rubber composition helps determine whether a selected grafted rubber component will locate in the carbonate polymer phase and/or at the interface of the two phases during the melt mixing of the components.

As used herein, the terms "located in the carbonate polymer phase" and "not located in the monovinylidene aromatic polymer phase" mean that when the polymer blend is examined, most suitably by transmission electron photomicrograph, the dispersed particles or domains of rubber are completely or mostly surrounded by carbonate polymer. Although some of the rubber particles or domains may be at or very near the interface of the carbonate polymer and monovinylidene aromatic copolymer phases, and possibly contacting the monovinylidene aromatic copolymer, the benefits of the present invention are obtained where the major portion, preferably all, of any rubber phase volume is located in the carbonate polymer phase.

Preferably, the optionally grafted rubber polymer impact modifier is a grafted homopolymer or copolymer of butadiene which is grafted with a polymer of styrene and methyl methacrylate. Along the lines of U.S. Pat. No. 5,087,663, a butadiene rubber component that is grafted with a polymer of styrene and methyl methacrylate, is located preferentially in the carbonate polymer provided that the monovinylidene aromatic copolymer contains at least about 23 weight percent ethylenically unsaturated nitrile monomer, preferably at least about 25 weight percent, these weight percentages being based upon weight of monovinylidene aromatic monomer(s) and comonomer(s) in the monovinylidene aromatic copolymer. If the optionally grafted rubber polymer component is desired to be used in the blends according to the present invention, those skilled in this area will be able to recognize or prepare other rubber compositions and/or monovinylidene aromatic copolymer compositions that result in the required location of the rubber component in the carbonate polymer phase of the blends according to the present invention.

Some of the preferred rubber-containing materials of this type are the known MBS-type core/shell grafted copolymers having a Tg less than 0° C. and a rubber content greater than 40 percent, typically greater than 50 percent. They are generally obtained by graft polymerizing styrene and methylmethacrylate and/or equivalent monomers in the presence of a conjugated diene polymer rubber core, preferably a butadiene homo- or co-polymer. The grafting monomers may be added to the reaction mixture simultaneously or in sequence, and, when added in sequence, layers, shells or wart-like appendages can be built up around the substrate latex, or core. The monomers can be added in various ratios to each other.

The carbonate polymer resins usefully employed according to the present invention are those previously known and described in the prior art. As known, such resins include the carbonate resins obtained by the interfacial, melt or solution polymerization of a dihydroxy monomer compound, preferably a dihydroxyaryl compound, such as a bis-dihydroxyarylalkane or preferably a dihydroxy silicon-containing compound, with a polycarbonate precursor such as phosgene, a bischloroformate or a dicarbonate such as diphenyl carbonate or dimethyl carbonate. Examples of suitable dihydroxy silicon-containing compounds are shown in U.S. Pat. Nos. 3,189,662; 3,419,634; 3,821,325; 4,584,360 and 5,310,793 which are incorporated by reference with regard to such monomers. Preferably the carbonate polymer is an aromatic carbonate polymer, more preferably it is prepared from an aromatic diol such as bisphenol A, tetrabromo-bisphenol A, tetramethyl bisphenol A, 1,1-bis(4-hydroxyphenyl)-1 phenylethane, bishydroxyphenylfluorene or mixtures of two or more of these.

In addition to the suitable polycarbonates prepared by exclusive use of one or more of the above diols, carbonate polymers suitable for use according to the claimed invention could be prepared in the presence of an amount of a diacid or diacid chloride to produce the known poly(ester-carbonates).

The carbonate polymers suitable for use in the present invention include a broad range of the known carbonate polymers in terms of molecular weight or melt flow rate (which is an indirect indication of resin molecular weight). In general, to obtain the desired processability, the carbonate polymer molecular weight should provide a resin melt flow rate (MFR) of at least about 0.1 grams per 10 minutes (g/10 min) by ASTM 1238-35, condition 0 (a temperature of 300° C. and a load of 1.2 kilograms), preferably at least about 0.5 g/10 min, more preferably at least about 1 g/10 min, and most preferably at least about 3 g/10 min. In order to provide the desired level of physical properties, including toughness, the carbonate polymer molecular weight should provide a resin melt flow rate (MFR) of less than about 80 g/10 min, preferably less than about 40 g/10 min, more preferably less than about 30 g/10 min, and most preferably less than about 20 g/10 min.

These carbonate polymers are employed in the blends according to the invention in amounts sufficient to provide the desired levels of toughness and resistance to heat. In general the carbonate polymer is employed in an amount of at least about 55, preferably at least about 60, more preferably at least about 70 and most preferably at least about 75 percent by weight based on weight of carbonate and monovinylidene aromatic polymers and, if used, rubber. Usually, with these considerations in mind, the carbonate polymer is employed in an amount of up to and including about 95, preferably up to and including about 90 and more preferably up to and including about 85 percent by weight based on weight carbonate and monovinylidene aromatic polymers and, if used, rubber.

It has been found that recycled carbonate polymer, which normally is somewhat more brittle than virgin resin, can suitably be employed in the carbonate polymer in compositions according to the present invention in amounts up to about 75 weight percent based on carbonate polymer, preferably up to about 50 weight percent, without experiencing unacceptable brittleness in the blend.

In general, the blends according to the present invention can incorporate talc, clay or a similar type of filler which has a number average particle size less than or equal to about 10 micrometers (μm) and an average diameter to thickness ratio (D/T) of from about 4 to about 30 and provides the desired levels of physical and other property requirements such as toughness, modulus (stiffness) and resistance to linear thermal expansion. Several varieties of talc and clay filler materials have been found to be especially suitable.

As disclosed in U.S. Pat. No. 5,091,461, elongated or plate-shaped fillers having the specified small particles have been found to better maintain the toughness properties of resin blends as compared to fibrillar or spherical shaped fillers. The relevant portions of U.S. Pat. No. 5,091,461 relating to the disclosed talc fillers are hereby incorporated by reference herein. The suitability of the filler in maintaining the preferred levels of impact resistance of molded articles prepared from the resin has been found to be a function of the average diameter/thickness ratio (D/T) of the filler particles together with obtaining a uniformly small particle-sized filler. Highly preferred are those compositions incorporating fillers having an average diameter/thickness ratio (D/T) as measured according to the below-described technique of at least about 4, preferably at least about 6, more preferably at least about 7. With regard to the maximum level for the D/T ratio, it has been found desirable to have a value up to and including about 30, preferably up to and including about 24, preferably up to and including about 18, more preferably up to and including about 13, and most preferably up to and including about 10.

For determining the D/T ratio, the diameter (or longest dimension) of the fillers as well as their thickness (shortest dimension of the 2 dimensions measurable) can be measured by preparing a filler modified polymeric resin sample and measuring the particle dimensions of the dispersed particles on electron photomicrographs of thin sections of the polymers. The electron photomicrograph should have a magnification of from 3000× to 15000×, preferably about 7500×. By physically measuring the diameter/thickness of a representative sample of at least 25 and preferably at least 50 filler particles, one can obtain a relatively accurate value for the diameter/thickness ratio.

The inorganic fillers preferably employed according to the present invention are the known mineral talcs and clays. Preferred are the uncalcined talcs and clays having very low free metal oxide content. Talcs and clays are generally known fillers for various polymeric resins. See for example U.S. Pat. Nos. 5,091,461 and 3,424,703 and EP 391,413, where these materials and their suitability as filler for polymeric resins are generally described.

The mineral talcs best suited are hydrated magnesium silicates as generally represented by the theoretical formula:

$$3MgO.4SiO_2.H_2O.$$

Compositions of talcs may vary somewhat with locality in which they are mined. Montana talcs, for example, closely approach this theoretical composition. Suitable mineral talcs of this type are commercially available as Microtalc MP 25-38 and Microtalc MP 10-52 from Pfizer.

The clays best suited for use are hydrous alumino silicate-type compounds, generally represented by the formula:

$$Al_2O_3.SiO_2.2H_2O.$$

Suitable clay materials are commercially available as Tex 10R brand clay from Anglo American Clay Co.

As is disclosed in U.S. Pat. No. 5,091,461, elongated or plate-shaped fillers having the specified uniformly small particles have been found to better maintain the toughness properties of resin blends as compared to fillers which are spherical shaped and/or have larger particles. To similarly obtain the most preferred polymeric blends according to the present invention it is desirable to employ specific fillers where the particles have a very small average particle size and have a relatively narrow particle size distribution. As used herein, the "average particle size" and "maximum particle size" are measured by Coulter Counter techniques. As known to those skilled in the art, Coulter Counter techniques measure these values based on volume and give an equivalent spherical volume diameter meaning that the diameter readings are diameters that would be observed for spheres having the same volume as the plate shaped particles. Therefore, if measuring the filler particle sizes by other techniques, very slightly different values could be observed.

Thus, the carbonate polymer compositions included within the scope of this invention generally utilize such inorganic fillers with a number average particle size as measured by Coulter Counter of less than or equal to about 10 micrometers (μm) preferably less than or equal to about 3 μm, more preferably less than or equal to about 2 μm, more preferably less than or equal to about 1.5 μm and most preferably less than or equal to about 1.0 μm. In general, smaller average particle sizes, if available, could very suitably be employed but it has been found difficult to obtain fillers of this type having an average particle size less than about 1.5 μm.

In addition to having the specified small average particle size, it has also been found to be important in optimizing the filled blend impact properties to provide uniformly small particle-sized fillers where the number or amount of larger particles ("maximum particle size") is reduced. In this regard, preferred maximum particle size specifications have been determined for the most preferred fillers used in the blends according to the invention. Suitable fillers generally have a maximum particle size less than or equal to about 50 μm, preferably less than or equal to about 30 μm, more preferably less than or equal to about 25 μm, more preferably less than or equal to about 20 μm and most preferably less than or equal to about 15 μm.

Another way of specifying the desired uniform small particle size and particle size distribution of the fillers preferably used in the practice of the present invention is to specify that at least 98 weight percent, preferably at least 99 weight percent, of the particles thereof in final blend have an equivalent spherical volume diameter less than about 44 μm, preferably less than about 20 μm. The weight percentage of the filler particles having such diameters can similarly be measured by particle size analysis with a Coulter Counter.

In preparing the carbonate polymer compositions according to the present invention and obtain optimized combinations of toughness, stiffness and resistance to thermal linear expansion, it has been found generally desirable to employ filler in an amount of at least about 1, preferably at least about 3 and more preferably at least about 5 percent by weight based on weight of filler, carbonate polymer, monovinylidene aromatic polymer and optional rubber. Usually it has been found sufficient to employ an amount of filler up to and including about 20, preferably about 15, more preferably about 12 and most preferably about 10 percent by weight, which weight percentages are based on weights of filler, carbonate polymer, monovinylidene aromatic polymer and optional rubber. As mentioned above, where the inorganic filler locates preferentially in the monovinylidene aromatic copolymer, such as with talc- and clay-type fillers, this correspondingly increases the monovinylidene aromatic copolymer volume. The contents of these two components, therefore, need to be balanced appropriately. In this regard, in the preferred embodiments of the present invention, it has been found that the total volume of the two components should not exceed about 45 weight percent for optimized property combinations in the blends, and preferably is less than about 40 weight percent, more preferably less than about 38 weight percent and most preferably less than about 33 weight percent.

With regard to obtaining optimized properties in articles prepared from the blend resins, it has been found that extremes in temperature conditions can result in poor fitting of various components of the finished assembly unless the coefficient of linear thermal expansion, as measured according to ASTM D-696 in units of inch per inch per °F. (in/in/°F.) or millimeter per millimeter per °C. (mm/mm/°C.) is less than about $3.7 \times 10^{-5}$ in/in/°F. ($6.7 \times 10^{-5}$ mm/mm/°C.), preferably less than about $3.5 \times 10^{-5}$/°F. ($6.3 \times 10^{-5}$/°C.), and more preferably less than about $3.3 \times 10^{-5}$/°F. ($5.6 \times 10^{-5}$/°C.), over the temperature range of −22° to 185° F. (−30° to 85° C.).

It has surprisingly been found that injection molded components prepared from the resin blends of the present invention generally have an exceptionally smooth, reduced gloss, defect-free surface finish. These features, together with the improved combinations of resistance to linear thermal expansion, modulus, heat resistance and toughness make these resins desirable for many applications such as injection molding, extrusion and blow molding of the resins into desirable shaped articles. In addition, extruded materials can be readily thermoformed into desired shaped articles.

The compositions according to the present invention are prepared by blending the foregoing components according to known blending and mixing techniques. Desirably the components may be first mixed or dry blended prior to melt blending in an appropriate extruder or other melt blending device, preferably under vacuum for complete water and volatile removal. The components may be combined and blended in any order. In order to improve the mixing of fine, powdery fillers into the polymer blend compositions, it may be desirable to initially mix the filler with a polymer component having a similarly fine and powdery consistency, if possible. In this regard, grinding of one of the polymer components may be desired if not already available in such form.

In addition to the foregoing components, additional additives may be included in the blend as long as they do not substantially deleteriously affect the other physical properties of the composition. Such additional additives may include, for example, pigments; light stabilizers such as U.V. absorbers; antioxidants; processing aids such as internal lubricants and mold release agents such as waxes; flame and drip retardants; filler coupling agents, for example the polyfunctional organosilicon compounds disclosed in U.S. Pat. No. 4,528,303 and other additives.

Having described the invention the following examples are provided as further illustrative and are not to be construed as limiting. Parts and percentages are based on weight.

As shown in the following tables, a, series of filled carbonate polymer/monovinylidene aromatic copolymer blends were prepared varying the filler type, filler amount, carbonate polymer and monovinylidene aromatic polymer. In addition to the components shown in the following tables, the blends also contained standard antioxidants and used epoxidized soybean oil (ESO) to tackify the resin pellets to facilitate the combination of powdery additives such as the filler.

The carbonate polymer resins are mostly commercially available grades of Calibre (TM) brand, bisphenol A-based polycarbonate (PC) produced by The Dow Chemical Company. The melt flow rates (MFR) are measured in grams per 10 minutes (g/10 min) according to ASTM D-1238, condition 0 while the weight average molecular weight values (Mw) are measured by gel permeation chromatography using a polystyrene standard.

TABLE 1

Carbonate Polymers

| | MFR | $M_w$ | Trade Name |
|---|---|---|---|
| PC-10 | 10 | 28,400 | CALIBRE* 300-10 |
| PC-13 | 13 | 26,800 | CALIBRE* 300-15 |
| PC-14 | 14 | 26,300 | CALIBRE* 300-15 |
| PC-20 | 20 | 22,000 | CALIBRE* 300-20 |
| Ground Flake | 14 | 26,000 | |

The monovinylidene aromatic copolymer resins identified in the following table are copolymers of styrene and acrylonitrile (referred to below as "SAN") and are a mixture of experimental and commercially available products.

TABLE 2

Monovinylidene Aromatic Copolymer Components

| No. | Description | Mw | Wt % AN |
|---|---|---|---|
| SAN-1 | Poly(styrene/acrylonitrile) | 278,000 | 6% AN |
| SAN-2 | Poly(styrene/acrylonitrile) | 174,000 | 16% AN |
| SAN-3 | Poly(styrene/acrylonitrile) | 170,000 | 20% AN |
| SAN-4 | Poly(styrene/acrylonitrile) | 150,000 | 25% AN |
| SAN-5 | Poly(styrene/acrylonitrile) | 175,000 | 30% AN |
| SAN-6 | Poly(styrene/acrylonitrile) | 80,000 | 31% AN |
| SAN-7 | Poly(styrene/acrylonitrile) | 95,000 | 31% AN |
| SAN-8 | Poly(styrene/acrylonitrile) | 135,000 | 31% AN |
| SAN-9 | Poly(styrene/acrylonitrile) | 142,000 | 39% AN |
| ABS-1* | Poly(styrene/acrylonitrile) containing about 20 weight percent butadiene polymer rubber grafted with SAN | 155,000 (SAN) | 28% AN (in SAN) |

*Monovinylidene aromatic copolymer not suitable for use according to the present invention As indicated, a butadiene rubber-modified copolymer of styrene and acrylonitrile (referred to herein as ABS or an ABS-type resin) was used to provide control blends where a grafted rubber polymer component was located in the monovinylidene aromatic copolymer. Transmission electron microscopy of $OsO_4$ and $RuCl_4$ stained samples is used for visual determination of which phase contains the rubber particles. The ABS resin was a mass solution polymerized ABS and contained the indicated amounts of (B) SAN including both ungrafted and grafted polymer and (D) butadiene rubber which level does not include grafted SAN. The SAN and Rubber levels were determined by the relative amounts of rubber and monomers incorporated during production of the ABS resin.

In several of the compositions that were prepared, amounts of an optional core shell grafted rubber components were incorporated. There are small monovinylidene aromatic copolymer (MVAC) components in Copolymers 1 and 2 comprising styrene, methyl methacrylate and small amounts of other crosslinking and proprietary comonomers, which are substantially completely graft polymerized to the rubber. According to information from the supplier, these materials contained the below indicated levels of rubber and methylmethacrylate (MMA).

In several of the compositions that were prepared a methyl methacrylate grafted ethylene-carbon monoxide rubbery component ("Copolymer 3") was incorporated. This product is a graft copolymer composed of a substrate copolymer of 90 weight percent ethylene and 10 weight percent carbon monoxide which is then grafted with about 20 weight percent of a mixture of methyl methacrylate (94 wt %) and methyl acrylate (6 wt %) generally according to the process shown in U.S. Pat. No. 5,079,316.

TABLE 3

Optional Rubber Polymer Materials

| | MVAC Level (wt %) | MMA Comonomer Content in MVAC (wt %) | Rubber Level (wt %) and Type |
|---|---|---|---|
| Core/Shell MBS Copolymer 1 | 28 | about 40 | 72 Butadiene |
| Core/Shell Copolymer 2* Paraloid 3339 | 22 | estimated to be about 90 | 78 Butyl Acrylate |
| Copolymer 3 MMA-grafted ECO | 0 | N/A | 80 Ethylene/-Carbon monoxide |

*Commercially available from Ameri-Haas as Paraloid 3339

The talc filler used in the experiments was the commercially available mineral talc Microtalc MP 10-52 available from Pfizer identified below. Chemically this material is a hydrated magnesium silicate as represented by the formula:

$$3MgO.4SiO_2.H_2O.$$

For this filler, shape and ratio of the diameter to the thickness of the filler particles (D/T) were determined by preparing a filler modified polymeric resin sample, and preparing transmission electron photomicrographs (TEM's) of thin sections of the polymers at magnifications in the range of 3,000 to 15,000×. Then shapes and sizes were determined by physically measuring the diameters and thicknesses for a representative sample of at least 25 filler particles and computing their ratio. The number average particle size and maximum particle size in micrometers (μm) ("Ave. Particle Size" and "Max. Particle Size", respectively) are approximates (±5%) and were determined by Coulter Counter analysis. The weight percentages of particles in the blend having a diameter less than about 44 μm and less than about 20 μm ("Wt %<44 μm" and "Wt %<20 μm") are also measured by Coulter Counter.

For comparison purposes, a glass fiber filler, Owens Corning OCF 415 brand fiber, was employed in an otherwise similar blend.

TABLE 4

Inorganic Fillers

| Type | Trade Name | Shape | D/T | Ave. Particle Size (μm) | Max. Particle Size (μm) | Wt % <20 μm | Wt % <40 μm |
|---|---|---|---|---|---|---|---|
| Talc | Microtalc MP 10-52 | Plate | 9.0 | 0.9 | 10 | 100 | 100 |
| Glass Fiber | Owens Corning OCF 415 | Fiber | | | | | |

The amount of talc in the blend product was confirmed to correspond to the predetermined incorporation levels by a combustion analysis where all organic matter in the sample is burned away and the remaining inorganic component weighed. The results of this analysis, the weight percent talc based on total composition weight, are shown as "Percent Talc Ash" in the data tables.

In addition, all of the Experimental Compositions contained Monarch 800 brand carbon black, a commercially available product from Cabot.

The components to be blended were dry blended and melt mixed under 20 to 27 inches of vacuum at 270° C. on a 30mm Werner-Pfleiderer co-rotating, twin screw extruder at a speed of 250 rpm. The heaters were maintained at 518° F. (270° C.) and the throughput rate was about 30 to 40 lbs/hour (13.6 Kg/hr). Each extruded composition was passed through a water bath, chopped into granules and collected for molding. Granules were thoroughly dried in a circulated air oven at 110° C. for 4 to 6 hours prior to molding. All samples were prepared by injection molding on a 75 ton Arburg brand molding machine. Molding temperatures for the barrel were set at 270° C. to 290° C. while the mold temperature was set at 150° F. to 160° F. (66° to 71° C.).

The physical properties of the resulting injection molded samples were then measured using standard ASTM test procedures. Test results are shown in the Tables. ASTM D-696 was used to measure the coefficient of linear thermal expansion (CLTE) and the results are reported as $\times 10^{-5}/°C$. (and $\times 10^{-5}/°F$.). Dart impact strength is measured according to ASTM D-3763-86 at 23° C. and is reported in inch pounds (In Lbs) and Joules (J).

Izod impact resistance values were obtained according to ASTM D-256 at 23° C. using an Izod impact tester and are reported in inch pounds (In Lbs) and Joules (J). Notched samples were notched with a low speed notcher equipped with a 9.6 mil cutting wheel. Unnotched weldline Izod impact resistance values were obtained using samples cut from the middle of a double gated tensile bar and tested on an Izod impact tester and are reported in inch pounds (In Lbs) and Joules (J). Except where stated otherwise, the specimen thickness was 0.125 inches (3.12 mm) and the impact velocity was 200 meters/minute (8,000 inches/min).

Tensile tests (Tens Strgth Yield) were made using an Instron brand tensile tester according to ASTM D-638 at a single strain rate of 2 inch/min and the results are reported in pounds per square inch (PSI) and megaPascals (MPa). The flexural modulus (Flex Modulus) of the samples was also tested on the Instron tester at 0.2 inch/min (according to ASTM D-790) and the results are reported in pounds per square inch times 1000 (psi×1,000) and megaPascals (MPa). The melt flow rate values (MFR) reported below were measured according to ASTM D-1238-85 at 265° C. with a 3.8 kilogram weight and are reported in grams per ten minutes (gr/10 min). The heat distortion temperature under load (DTUL) is measured according to ASTM D-648-82 on a Tinius Olsen Heat Distortion Apparatus and is reported in °F. and °C.

The Die Swell findings reported below were obtained by visual observation of the molten polymer blend strand during extrusion, the presence of die swell making it extremely difficult to maintain a uniform strand during extrusion. The surface quality is determined visually with the aid of a magnifying glass, with Good ("G") indicating smooth and Poor ("P") indicating rough.

The ultraviolet radiation resistance of the compositions ("UV Resistance") containing no diene rubber is expected to be good ("G") while diene rubber containing compositions would have poorer ("P") UV resistance.

TABLE 5

Effect of Filler and Monovinylidene Aromatic Copolymer

|  |  | Control 1* | Control 2* | Control 3* | Control 4* | Ex. 1 | Ex. 2 | Ex. 3 | Ex. 4 | Ex. 5 | Ex. 6 |
|---|---|---|---|---|---|---|---|---|---|---|---|
| PC-10 | Wt Pts |  | 1183 | 1264 | 1379 | 1264 | 1264 | 1264 | 1264 | 1264 | 1264 |
|  | Wt % |  | 65 | 69 | 69 |  |  |  |  |  |  |
| PC-20 | Wt Pts | 1820 |  |  |  |  |  |  |  |  |  |
|  | Wt % | 100 |  |  |  |  |  |  |  |  |  |
| ABS-1 | Wt Pts | — | 637 | — | — | — | — | — | — | — | — |
| (28% AN) | Wt % |  | 35 |  |  |  |  |  |  |  |  |
| SAN-1 | Wt Pts | — | — | — | — | 556 | — | — | — | — | — |
| (6% AN) | Wt % |  |  |  |  | 31 |  |  |  |  |  |
| SAN-2 | Wt Pts | — | — | — | — | — | 556 | — | — | — | — |
| (16% AN) | Wt % |  |  |  |  |  | 31 |  |  |  |  |
| SAN-3 | Wt Pts | — | — | — | — | — | — | 556 | — | — | — |
| (20% AN) | Wt % |  |  |  |  |  |  | 31 |  |  |  |
| SAN-4 | Wt Pts | 0 | — | 556 | 609 | — | — | — | 556 | — | — |
| (25%AN) | Wt % | 0 |  | 31 | 31 |  |  |  | 31 |  |  |
| SAN-5 | Wt Pts | — | — | — | — | — | — | — | — | 556 | — |
| (30% AN) | Wt % |  |  |  |  |  |  |  |  | 31 |  |
| SAN-9 | Wt Pts | — | — | — | — | — | — | — | — | — | 556 |
| (39% AN) | Wt % |  |  |  |  |  |  |  |  |  | 31 |
| Filler | Wt Pts | 168 | 168 | 168 | 0 | 168 | 168 | 168 | 168 | 168 | 168 |
|  | Wt % | 8.4 | 8.4 | 8.4 | — | 8.4 | 8.4 | 8.4 | 8.4 | 8.4 | 8.4 |
| All Talc, except where shown |  |  |  | Glass Fiber |  |  |  |  |  |  |  |
| Carbon Black | Wt Pts | 4 | 4 | 4 | 4 | 4 | 4 | 4 | 4 | 4 | 4 |
|  | Wt % | 0.2 | 0.2 | 0.2 | 0.2 | 0.2 | 0.2 | 0.2 | 0.2 | 0.2 | 0.2 |
| CLTE |  |  |  |  |  |  |  |  |  |  |  |
| $\times 10^{-5}/°F$. |  | 3.11 | 3.46 | N/A | 3.79 | 3.18 | 3.12 | 3.09 | 3.02 | 2.95 | 2.94 |
| $\times 10^{-5}/°C$. |  | 5.60 | 6.23 |  | 6.82 | 5.72 | 5.62 | 5.56 | 5.44 | 5.31 | 5.29 |
| Dart Impact 23° C. |  |  |  |  |  |  |  |  |  |  |  |
| (In Lbs) |  | 322 | 413 | 33 | 438 | 77 | 488 | 510 | 510 | 457 | 35 |
| (J) |  | 36 | 47 | 4 | 50 | 9 | 56 | 58 | 58 | 52 | 4 |
| Tens Strgth Yield |  |  |  |  |  |  |  |  |  |  |  |
| (psi) |  | 9324 | 8324 | 10181 | 10138 | 9985 | 10530 | 10474 | 10298 | 10483 | 11058 |

TABLE 5-continued

Effect of Filler and Monovinylidene Aromatic Copolymer

|  | Control 1* | Control 2* | Control 3* | Control 4* | Ex. 1 | Ex. 2 | Ex. 3 | Ex. 4 | Ex. 5 | Ex. 6 |
|---|---|---|---|---|---|---|---|---|---|---|
| (MPa) | 64 | 57 | 70 | 70 | 69 | 73 | 72 | 71 | 72 | 76 |
| Flex Modulus |  |  |  |  |  |  |  |  |  |  |
| (psi × 1,000) | 423 | 416 | 541 | 408 | 430 | 507 | 503 | 517 | 540 | 523 |
| (MPa) | 2917 | 2868 | 3729 | 2813 | 2965 | 3496 | 3468 | 3565 | 3723 | 3606 |
| MFR(gr/10 min) | — | 10.3 | 10.3 | — | 9.4 | 17.3 | 14.5 | 15.3 | 12.4 | 9.3 |
| Die Swell | No | No | No | Yes | No | No | No | No | No | No |
| Surface Quality | G | G | P | G | G | G | G | G | G | G |
| UV Resistance | G | P | G | G | G | G | G | G | G | G |

*Not an example of the present invention

TABLE 6

Effect of SAN Molecular Weight

|  |  | Ex. 7 | Ex. 8 | Ex. 9 | Ex. 10 |
|---|---|---|---|---|---|
| PC-10 | Wt Pts | 1264 | 1264 | 1264 | 1264 |
|  | Wt % | 69 | 69 | 69 | 69 |
| SAN-6 (Mw 80,000) | Wt Pts | 556 | — | — | — |
|  | Wt % | 31 |  |  |  |
| SAN-7 (Mw 95,000) | Wt Pts | — | 556 | — | — |
|  | Wt % |  | 31 |  |  |
| SAN-8 (Mw 135,000) | Wt Pts | — | — | 556 | — |
|  | Wt % |  |  | 31 |  |
| SAN-5 (Mw 175,000) | Wt Pts | — | — | — | 556 |
|  | Wt % |  |  |  | 31 |
| Talc | Wt Pts | 168 | 168 | 168 | 168 |
|  | Wt % | 8.45 | 8.45 | 8.45 | 8.45 |
| Carbon Black | Wt Pts | 4 | 4 | 4 | 4 |
|  | Wt % | 0.2 | 0.2 | 0.2 | 0.2 |
| SAN Mol Wt (×1000) |  | 80 | 95 | 135 | 175 |
| % AN |  | 31 | 31 | 31 | 30 |
| CLTE |  |  |  |  |  |
| ×10$^{-5}$/°F. |  | 2.96 | 2.95 | 2.94 | 2.92 |
| ×10$^{-5}$/°C. |  | 5.33 | 5.31 | 5.29 | 5.26 |
| Dart Impact 23° C. |  |  |  |  |  |
| (In Lbs) |  | 21 | 48 | 98 | 479 |
| (J) |  | 2.4 | 5.5 | 11.2 | 54.6 |
| Izod Impact 23° C. |  |  |  |  |  |
| Notched | (Ft Lbs/in) | 0.5 | 0.7 | 0.9 | 1.0 |
|  | (J/m) | 26.5 | 37 | 48 | 53 |
| Izod Impact 23° C. |  |  |  |  |  |
| Unnotched | (Ft Lbs/in) | 15.4 | 20.2 | 21.8 | 25.2 |
|  | (J/m) | 816 | 1071 | 1155 | 1336 |
| DTUL 66 psi (0.455 MPa) |  |  |  |  |  |
| °F. |  | 255 | 258 | 261 | 261 |
| °C. |  | 124 | 126 | 127 | 127 |
| Tens Strgth Yield |  |  |  |  |  |
| (psi) |  | 10313 | 10405 | 10616 | 10535 |
| (MPa) |  | 71 | 72 | 73 | 73 |
| % Elongation |  | 11 | 18 | 27 | 32 |
| Die Swell |  | No | No | No | No |
| Surface Quality |  | G | G | G | G |

TABLE 7

Effect of Rubber Location

|  |  | Control 2 | Control 5 | Ex. 11 | Ex. 12 | Ex. 13 |
|---|---|---|---|---|---|---|
| PC-10 | Wt Pts | 1183 | 1177 | 1177 | 1177 | 1177 |
|  | Wt % | 65 | 64.5 | 64.5 | 64.5 | 64.5 |

TABLE 7-continued

Effect of Rubber Location

|  |  | Control 2 | Control 5 | Ex. 11 | Ex. 12 | Ex. 13 |
|---|---|---|---|---|---|---|
| SAN-2 (16% AN) | Wt Pts | — | 519 | — | — | — |
|  | Wt % |  | 28.5 |  |  |  |
| SAN-4 (25% AN) | Wt Pts | — | — | 519 | 519 | 519 |
|  | Wt % |  |  | 28.5 | 28.5 | 28.5 |
| ABS-1 | Wt Pts | 637 | — | — | — | — |
|  | Wt % | 35 |  |  |  |  |
| Core/Shell Copolymer 1 | Wt Pts | — | 124 | 124 | — | — |
|  | Wt % |  | 7 | 7 |  |  |
| Core/Shell Copolymer 2 | Wt Pts | — | — | — | 124 | — |
|  | Wt % |  |  |  | 7 |  |
| MMAgECO Copolymer 3 | Wt Pts | — | — | — | — | 124 |
|  | Wt % |  |  |  |  | 7 |
| % Rubber | Wt % | 7.1 | 5.0 | 5.0 | 5.5 | 4.7 |
| ~Rubber Tg °C. |  | −80 | −80 | −80 | −40 | −20 |
| Rubber Location |  | SAN | SAN | PC | PC | PC |
| Talc | Wt Pts | 168 | 168 | 168 | 168 | 168 |
|  | Wt % | 8.45 | 8.45 | 8.45 | 8.45 | 8.45 |
| CarbonBlack | Wt Pts | 4 | 4 | 4 | 4 | 4 |
|  | Wt % | 0.2 | 0.2 | 0.2 | 0.2 | 0.2 |
| CLTE |  |  |  |  |  |  |
| $\times 10^{-5}/°F.$ |  | 3.46 | 3.47 | 3.32 | 3.35 | 3.36 |
| $\times 10^{-5}/°C.$ |  | 6.23 | 6.25 | 5.98 | 6.03 | 6.05 |
| Dart Impact 23° C. |  |  |  |  |  |  |
| (In Lbs) |  | 413 | 454 | 494 | 448 | 417 |
| (J) |  | 47 | 52 | 56 | 51 | 48 |
| Izod Impact 23° C. |  |  |  |  |  |  |
| (Ft lbs/in) |  | 8.1 | 3.7 | 6.1 | 5.9 | 1.8 |
| (J/m) |  | 432 | 198 | 326 | 315 | 96 |
| Flex Modulus |  |  |  |  |  |  |
| (psi × 1,000) |  | 416 | 401 | 459 | 440 | 436 |
| (MPa) |  | 2868 | 2765 | 3165 | 3034 | 3006 |
| Surface Quality |  | G | G | G | G | G |
| Die Swell |  | No | No | No | No | No |

As can be seen in the above tables, monovinylidene aromatic copolymer (SAN) resins containing 6, 16, 20, 25, 31, and 39% comonomer (AN) and having roughly the same Mw (150,000–170,000) were evaluated. The evaluation results indicate several trends in physical and rheological properties are present as the percent comonomer is increased from 5% to 39%. These trends generally show that as the percent comonomer is increased, the viscosity, tensile strength, flexural modulus and notch sensitivity increases while gloss and CLTE is reduced. Practical toughness as measured by dart impact shows an optimum between 16% and 31% comonomer with very poor results observed on either side. Transmission Electron Micrographs (TEM) appear to indicate the talc is located primarily in the SAN phase at higher comonomer content and in both phases at lower comonomer levels.

In addition, several SAN resins having about 31% comonomer with molecular weights ranging from 80,000 to 175,000 were evaluated. SAN molecular weight was also found to play a key role in achieving improved physical properties. For example, dart impact, tensile elongation viscosities all increased as the molecular weight was increased.

Based on these initial results it is believed that a monovinylidene aromatic copolymer resin having between 15% and 33% comonomer and a molecular weight greater than 140,000 (preferably above 145,000) provides low cost, good surface aesthetics, low CLTE, good UV resistance, easy flow, high modulus, good HDT and good practical toughness in the claimed blends.

In the further experimental compositions shown below, a variety of carbonate polymers are employed, along with a range of other component optionally suited for use in the compositions according to the present invention. Control 6 in Table 12 compares compositions according to the present invention with a commercially available, glass filled styrene maleic anhydride polymer resin commonly used for automotive interior parts.

TABLE 8

Effect of SAN Content

| | | Ex. No. | | | |
|---|---|---|---|---|---|
| | | 14 | 15 | 16 | 17 |
| PC | Wt Pts | 1618 | 1418 | 1218 | 1078 |
| | Wt % | 89 | 78 | 67 | 57 |
| SAN-4 | Wt Pts | 200 | 400 | 600 | 800 |
| | Wt % | 11 | 22 | 33 | 43 |
| Talc | Wt Pts | 170 | 170 | 170 | 170 |
| | Wt % | 8.5 | 8.5 | 8.5 | 8.5 |
| Carbon Black | Wt Pts | 4 | 4 | 4 | 4 |
| | Wt % | 0.2 | 0.2 | 0.2 | 0.2 |
| Izod Impact 23° C. | | | | | |
| Unnotched | (Ft Lbs/in) | 59.5 | 56.0 | 18.4 | 18.5 |
| | (J/m) | 3177 | 2990 | 983 | 988 |
| Izod Impact 23° C. | | | | | |
| Notched | (Ft Lbs/in) | 1.6 | 1.1 | 0.8 | 0.7 |
| | (J/m) | 85 | 59 | 43 | 36 |
| Dart Impact | | | | | |
| 23° C. | (In Lbs) | 440 | 426 | 55 | 92 |
| | (J) | 50 | 48 | 6 | 10 |
| 0° C. | (In Lbs) | 475 | 468 | — | — |
| | (J) | 54 | 53 | | |
| −30° C. | (In Lbs) | 413 | 295 | — | — |
| | (J) | 47 | 33 | | |
| DTUL 66 psi (0.455 MPa) | | | | | |
| °F. | | 280 | 274 | 263 | 263 |
| °C. | | 136 | 133 | 127 | 127 |
| DTUL 264 psi (1.82 MPa) | | | | | |
| °F. | | 255 | 248 | 226 | 224 |
| °C. | | 123 | 119 | 107 | 106 |
| Flex Modulus | (psi × 1000) | 478 | 501 | 518 | 541 |
| | (MPa) | 3276 | 3454 | 3572 | 3730 |
| Tens Strgth Yield | (psi) | 9624 | 10025 | 10595 | 10536 |
| | (MPa) | 66 | 69 | 73 | 73 |
| Tensile Break | (psi) | 8877 | 7762 | 6892 | 6391 |
| | (MPa) | 61 | 54 | 48 | 44 |
| % Elongation | | 177 | 167 | 37 | 20 |
| CLTE | | | | | |
| ×10⁻⁵/°F. | | 2.96 | 2.96 | 3.07 | 2.91 |
| ×10⁻⁵/°C. | | 5.33 | 5.33 | 5.53 | 5.24 |

TABLE 9

Effect of Ground Polymer and Talc Level

| | | 18 | 19 | 20 | 21 | 16 | 22 | 23 |
|---|---|---|---|---|---|---|---|---|
| PC | Wt Pts | 1432 | 1392 | 1352 | 1322 | 1218 | 1492 | 1392 |
| | Wt % | | | | | | | |
| PC-14 | Wt Pts | 1332 | 1292 | 1252 | 1222 | | 1392 | 1292 |
| PCGF | Wt Pts | 100 | 100 | 100 | 100 | | 100 | 100 |
| SAN-4 | Wt Pts | 500 | 500 | 500 | 500 | 600 | 300 | 400 |
| | Wt % | | | | | | | |
| Talc | Wt Pts | 60 | 100 | 140 | 180 | 170 | 200 | 200 |
| | Wt % | | | | | | | |
| Wt % SAN plus filler | | 28 | 30 | 32 | 33.5 | 38.5 | 25 | 30 |
| Carbon Black | Wt Pts | — | — | — | — | 4 | — | — |
| | Wt % | | | | | | | |
| Izod Impact 23° C. | | | | | | | | |
| Unnotched | (Ft Lbs/in) | 57.6 | 58.2 | 53.6 | 29.2 | 18.4 | 52.4 | 50.7 |
| | (J/m) | 3076 | 3108 | 2862 | 1559 | 983 | 2798 | 2707 |
| Izod Impact 23° C. | | | | | | | | |
| Notched | (Ft Lbs/in) | 1.2 | 1.0 | 1.1 | 0.8 | 0.8 | 1.0 | 1.0 |
| | (J/m) | 64 | 53 | 59 | 43 | 43 | 53 | 53 |

TABLE 9-continued

Effect of Ground Polymer and Talc Level

| | | 18 | 19 | 20 | 21 | 16 | 22 | 23 |
|---|---|---|---|---|---|---|---|---|
| Dart Impact | | | | | | | | |
| 23° C. | (In Lbs) | 460 | 450 | 430 | 407 | 55 | 402 | 413 |
| | (J) | 52 | 51 | 49 | 46 | 6 | 45 | 47 |
| 0° C. | (In Lbs) | 498 | 412 | 447 | 316 | --- | 411 | 411 |
| | (J) | 56 | 47 | 51 | 36 | --- | 46 | 46 |
| −30° C. | (In Lbs) | 433 | 484 | 244 | 61 | --- | 362 | 159 |
| | (J) | 49 | 55 | 28 | 7 | | 41 | 18 |
| DTUL 264 psi (1.82 MPa) | | | | | | | | |
| °F. | | 242 | 239 | 236 | 236 | 226 | 253 | 242 |
| °C. | | 116 | 114 | 112 | 112 | 107 | 122 | 116 |
| Flex Modulus | (psi × 1000) | 443 | 468 | 492 | 542 | 518 | 506 | 528 |
| | (MPa) | 3055 | 3227 | 3392 | 3737 | 3572 | 3489 | 3641 |
| Tens Strgth Yield | (psi) | 10204 | 10280 | 10399 | 10472 | 10595 | 10082 | 10305 |
| | (MPa) | 70 | 71 | 72 | 72 | 73 | 70 | 71 |
| Tensile Break | (psi) | 8660 | 7979 | 7881 | 7359 | 6892 | 7695 | 6844 |
| | (MPa) | 60 | 55 | 54 | 51 | 48 | 53 | 47 |
| % Elongation | | 199 | 182 | 125 | 32 | 37 | 68 | 45 |
| CLTE | | | | | | | | |
| ×10$^{-5}$/°F. | | 3.4 | 3.23 | 3.11 | 2.76 | 3.07 | 2.96 | 2.89 |
| ×10$^{-5}$/°C. | | 6.12 | 5.81 | 5.60 | 4.97 | 5.53 | 5.33 | 5.20 |

TABLE 10

Effect of PC Molecular Weight

| | | 24 | 25 | 26 | 27 | 28 | 29 |
|---|---|---|---|---|---|---|---|
| PC | Wt Pts | 1432 | 1372 | 1322 | 1432 | 1372 | 1322 |
| | Wt % | 78 | 75 | 73 | 78 | 75 | 73 |
| PC 14 | Wt Pts | --- | --- | --- | 1322 | 1272 | 1222 |
| PC 20 | Wt Pts | 1322 | 1272 | 1222 | --- | --- | --- |
| PC GF | Wt Pts | 100 | 100 | 100 | 100 | 100 | 100 |
| SAN 4 | Wt Pts | 400 | 450 | 500 | 400 | 450 | 500 |
| 25% AN | Wt % | 22 | 25 | 27 | 22 | 25 | 27 |
| Talc MP 10-52 | Wt Pts | 170 | 170 | 170 | 170 | 170 | 170 |
| | Wt % | 8.5 | 8.5 | 8.5 | 8.5 | 8.5 | 8.5 |
| Izod Impact 23° C. | | | | | | | |
| Unnotched | (Ft Lbs/in) | 40.4 | 30.4 | 24.7 | 55.5 | 47.3 | 29.2 |
| | (J/m) | 2157 | 1623 | 1319 | 2964 | 2526 | 1559 |
| Izod Impact 23° C. | | | | | | | |
| Notched | (Ft Lbs/in) | 0.8 | 0.8 | 0.7 | 1.0 | 1.0 | 0.8 |
| | (J/m) | 43 | 43 | 37 | 53 | 53 | 43 |
| Dart Impact | | | | | | | |
| 23° C. | (In Lbs) | 407 | 411 | 408 | 416 | 421 | 407 |
| | (J) | 46 | 46 | 46 | 47 | 48 | 46 |
| 0° C. | (In Lbs) | 390 | 387 | 383 | 450 | 425 | 316 |
| | (J) | 44 | 44 | 44 | 51 | 48 | 36 |
| −30° C. | (In Lbs) | 219 | 153 | 40 | 361 | 309 | 61 |
| | (J) | 25 | 17 | 5 | 41 | 35 | 7 |
| DTUL 264 psi (1.82 MPa) | | | | | | | |
| °F. | | 242 | 239 | 231 | 245 | 240 | 236 |
| °C. | | | | | | | |
| Flex Modulus | (psi × 1000) | 514 | 520 | 516 | 497 | 513 | 542 |
| | (MPa) | 3544 | 3585 | 3558 | 3427 | 3537 | 3737 |
| Tens Strgth Yield | (psi) | 10191 | 10271 | 10382 | 10138 | 10299 | 10472 |
| | (MPa) | 70 | 71 | 72 | 70 | 71 | 72 |
| Tensile Break | (psi) | 7600 | 7247 | 7536 | 7536 | 7425 | 7359 |
| | (MPa) | 52 | 50 | 52 | 52 | 51 | 51 |
| % Elongation | | 28 | 27 | 22 | 101 | 68 | 32 |
| CLTE | | | | | | | |
| ×10$^{-5}$/°C. | | 5.33 | 5.33 | 5.35 | 5.22 | 5.13 | 5.33 |
| ×10$^{-5}$/°F. | | 2.96 | 2.96 | 2.97 | 2.90 | 2.85 | 2.96 |

TABLE 11

Effect of Non-Grafted Rubber

| | | 30 | 31 | 32 |
|---|---|---|---|---|
| PC | Wt Pts | 1372 | 1352 | 1312 |
| | Wt % | 75 | 75 | 74 |
| PC 14 | Wt Pts | 1272 | 1252 | 1212 |
| PC GF | Wt Pts | 100 | 100 | 100 |
| SAN 4 | Wt Pts | 450 | 450 | 450 |
| | Wt % | 25 | 25 | 26 |
| Polyethylene 0.87 den | | — | 20 | 60 |
| Talc MP 10-52 | Wt Pts | 170 | 170 | 170 |
| | Wt % | 8.5 | 8.5 | 8.5 |
| Izod Impact 23° C. | | | | |
| Unnotched | (Ft Lbs/in) | 47.3 | 45.4 | 59.4 |
| | (J/m) | 2526 | 2424 | 3172 |
| Izod Impact 23° C. | | | | |
| Notched | (Ft Lbs/in) | 1.0 | 1.1 | 1.5 |
| | (J/m) | 53 | 59 | 80 |
| Dart Impact 23° C. | | | | |
| | (In Lbs) | 421 | 389 | 373 |
| | (J) | 48 | 44 | 42 |
| DTUL 264 psi (1.82 MPa) | | | | |
| | °F. | 240 | 237 | 238 |
| | °C. | | | |
| Flex Modulus | (psi × 1000) | 513 | 523 | 477 |
| | (MPa) | 3537 | 3606 | 3289 |
| Tens Strgth Yield | (psi) | 10299 | 10024 | 9578 |
| | (MPa) | 71 | 69 | 66 |
| Tensile Break | (psi) | 7425 | 6780 | 6132 |
| | (MPa) | 51 | 47 | 42 |
| % Elongation | | 68 | 42 | 86 |
| CLTE | ×10$^{-5}$/°F. | 2.85 | 3.17 | 3.16 |
| | ×10$^{-5}$/°C. | 5.13 | 5.71 | 5.69 |
| Rubber Location | | | PC | PC |

TABLE 12

Comparison with Commercial Filled Resin

| | | 33 | 34 | Control 6* Dylark 378-P20 (20% glass filled SMA) |
|---|---|---|---|---|
| PC | Wt Pts | 63.6 | 63.3 | |
| | Wt % | 70 | 70 | |
| PC 10 | Wt Pts | — | 59.0 | |
| PC 14 | Wt Pts | 59.6 | — | |
| PC GF | Wt Pts | 4.0 | 4.3 | |
| SAN 5 | Wt Pts | — | 27.0 | |
| | Wt % | | 30 | |
| SAN 4 | Wt Pts | 27.0 | — | |
| | Wt % | 30 | | |
| Talc MP 10-52 | Wt Pts | 9.0 | 9.3 | |
| | Wt % | 9.0 | 9.3 | |
| Glass Fiber | | | | 20 |
| Izod Impact 23° C. | | | | |
| Unnotched | (Ft Lbs/in) | 27.5 | 31.2 | 6.5 |
| | (J/m) | 1469 | 1666 | 347 |
| Izod Impact 23° C. | | | | |
| Notched | (Ft Lbs/in) | 0.8 | 0.9 | 1.5 |
| | (J/m) | 43 | 48 | 80 |
| Dart Impact | | | | |
| 23° C. | (In Lbs) | 446 | 454 | 121 |
| −30° C. | (In Lbs) | 185 | 139 | 138 |
| Dart Impact** | | | | |
| 23° C. | (In Lbs) | 391 | 435 | 45 |
| −30° C. | (In Lbs) | 210 | 248 | 89 |
| Tens Strgth Yield | (psi) | 10428 | 10631 | |
| | (MPa) | 72 | 73 | |
| Tensile Break | (psi) | 7251 | 6887 | |

TABLE 12-continued

Comparison with Commercial Filled Resin

|  |  | 33 | 34 | Control 6*<br>Dylark 378-P20<br>(20% glass filled SMA) |
|---|---|---|---|---|
|  | (MPa) | 50 | 48 |  |
| % Elongation Break |  | 30 | 48 | 1.5 |
| Tensile Modulus | (psi × 1000) | 550 | 579 |  |
|  | (MPa) | 3792 | 3992 |  |
| Flex Modulus | (psi × 1000) | 550 | 543 | 678 |
|  | (MPa) | 3792 | 3744 | 4675 |
| CLTE | ×10⁻⁵/°F. | 2.96 | 2.92 |  |
|  | ×10⁻⁵/°C. | 5.33 | 5.26 |  |

*Not an example of the present invention.
**Specimen thickness 0.10 inch (2.5 mm); impact velocity 16,000 inches/min (400 meters/min).

What is claimed is:

1. A filled melt blended polymer blend composition comprising (a) a carbonate polymer component; (b) a monovinylidene aromatic copolymer component not containing a rubber polymer component after the composition is melt blended; and (c) an inorganic filler in the form of particles which have a number average particle size less than or equal to about 10 micrometers (μm) and an average diameter to thickness ratio of (D/T) of from about 4 to about 30 as measured on an electron photomicrographs of a thin section of the polymer at a magnification of from 3,000× to 15,000×.

2. A filled polymeric blend composition according to claim 1 comprising (a) carbonate polymer in an amount of from about 50 to about 95 percent by weight based on weight of components (a) and (b); (b) monovinylidene aromatic copolymer in an amount of from about 5 to about 50 percent by weight based on weight of components (a) and (b); and (c) inorganic filler in an amount of from about 1 to about 17 percent by weight based on weight of components (a), (b) and (c).

3. A filled polymeric blend composition according to claim 1 wherein the inorganic filler is selected from the group consisting of talc, clay and mixtures thereof.

4. A filled polymeric blend composition according to claim 1 wherein the filler particles have an average diameter/thickness ratio of from about 6 to about 30.

5. A filled polymeric blend composition according to claim 1 wherein at least 99 percent of the filler particles have particle diameter less than about 44 μm.

6. A filled polymeric blend composition according to claim 1 wherein the inorganic filler is a hydrated magnesium silicate talc.

7. A filled polymeric blend composition according to claim 1 wherein the inorganic filler particles have an average particle size of about 2 μm or below.

8. A filled polymeric blend composition according to claim 1 wherein the inorganic filler particles have a maximum particle size of about 30 μm or below.

9. A filled polymeric blend composition according to claim 1 wherein the carbonate polymer comprises in polymerized form one or more dihydroxy monomers selected from the group consisting of bisphenol A, tetrabromobisphenol A, tetramethyl bisphenol A, 1,1-bis(4-hydroxyphenyl)-1phenylethane, or bishydroxyphenylfluorene.

10. A filled polymeric blend composition according to claim 1 wherein the carbonate polymer has a melt flow rate from about 3 to about 80 grams per 10 minutes according to condition O, ASTM 1238–35.

11. A filled polymeric blend composition according to claim 1 comprising a monovinylidene aromatic copolymer consisting essentially of copolymerized styrene and acrylonitrile.

12. A filled polymeric blend composition according to claim 11 wherein the weight average molecular weight of the styrene and acrylonitrile copolymer is from about 140,000 to about 250,000.

13. A filled polymeric blend composition according to claim 11 wherein the monovinylidene aromatic copolymer comprises from about 15 to about 35 percent by weight acrylonitrile based on weight styrene and acrylonitrile.

14. A filled polymeric blend composition according to claim 1 wherein the carbonate polymer component comprises (a)(1) a rubber polymer impact modifier component.

15. A filled polymeric blend composition according to claim 14 wherein the carbonate polymer component comprises (a)(1) a rubber polymer impact modifier component which is a grafted homopolymer or copolymer of butadiene which is grafted with a polymer of styrene and methyl methacrylate.

16. A filled polymeric blend composition according to claim 15 wherein the monovinylidene aromatic copolymer comprises in polymerized form styrene and at least about 23 weight percent acrylonitrile based on weight styrene and acrylonitrile.

17. A molded article prepared from a composition according to claim 1.

18. A molded article according to claim 17 which is an automobile interior instrument panel.

19. An improved process for reducing the die swell in processes for preparing extruded articles or pellets from carbonate polymer/monovinylidene aromatic copolymer blends comprising the step of extruding a polymer blend composition according to claim 1 to form an article or a strand which is cut into pellets.

20. A filled melt blended polymer blend composition consisting essentially of (a) a carbonate polymer component; (b) a monovinylidene aromatic copolymer component not containing a rubber component after the composition is melt blended; and (c) an inorganic filler in the form of particles which have a number average particle size less than or equal to about 10 micrometers (MM) and an average diameter to thickness ratio of (D/T) of from about 4 to about 30 as measured on an electron photomicrographs of a thin section of the polymer at a magnification of from 3,000× to 15,000×.

* * * * *

UNITED STATES PATENT AND TRADEMARK OFFICE
CERTIFICATE OF CORRECTION

PATENT NO. : 5,714,537
DATED : February 3, 1998
INVENTOR(S) : Michael K. Laughner; Robert C. Miller It is certified that error appears in the above-identified patent and that said Letters Patent is hereby corrected as shown below:

Clain 1, column 25, line 24, "robber" should correctly read --rubber--

Signed and Sealed this

Fifteenth Day of September, 1998

Attest:

BRUCE LEHMAN

Attesting Officer    Commissioner of Patents and Trademarks